United States Patent Office 3,579,297
Patented May 18, 1971

3,579,297
PROCESS OF MANUFACTURING AMMONIUM SALTS
Karl Gote Ekblom, Ljungaverk, Sweden, assignor to Fosfatbolaget AB, Stockholm, Sweden
Filed June 18, 1968, Ser. No. 738,033
Claims priority, application Sweden, Sept. 15, 1967, 12,742/67
Int. Cl. C01c 1/18, 1/28
U.S. Cl. 23—103
4 Claims

ABSTRACT OF THE DISCLOSURE

This invention relates to a method for controlling the reaction between ammonia and acid so as to minimize the formation of excess ammonia, which comprises withdrawing some vapor from the reaction zone, dividing said vapor into two streams, contacting it with an acid compound in excess of that needed to neutralize the free ammonia in the stream, cooling each stream to form an aqueous condensate, measuring the conductivity of each condensate, and regulating the introduction of reactants to the reaction zone in accordance with said conductivity measurements.

BACKGROUND

In the manufacture of ammonium salts, ammonia is reacted with concentrated or dilute acids. By way of example, ammonium nitrate is conventionally manufactured by continuously reacting gaseous ammonia and a 54% nitric acid solution in a reactor during which process the heat of neutralization is removed by evaporation of the water contained in the acid thus giving a highly concentrated ammonium nitrate solution (a brine) which can be further processed to crystals or prills of ammonium nitrate.

In the neutralizing step it is desired to prevent ammonia losses, i.e., to control the process so that the brine contains only a very slight excess of ammonia. There are, however, technical difficulties in the continuous determination of such very low concentrations of free ammonia. Analytical methods that are usually employed for the determination of free ammonia, such as measuring the electrical conductivity or the pH, cannot be used for testing of the brines, because changes in content of free ammonia affect conductivity or pH only slightly. The same disadvantage is inherent in known methods of carrying out measurments on condensates of the vapour from the reactor (cf. the curve of free $NH^3$ in FIG. 1), which is unfortunate because this would be an ideal solution to the problem, since the ammonia content in the vapor phase represents a function of the content of free ammonia in the brine within the reactor and is a direct measure of the ammonia losses in the neutralization process.

THE PRESENT INVENTION

The present invention relates to a method for the continuous determination of even minor quantities of free ammonia in the neutralization or reaction zone, thus enabling a careful control and regulation of the process in said reactor and accordingly a considerable reduction of the ammonia losses. The invention can be applied in the manufacture of ammonia salts such as ammonium acetate, ammonium phosphate, ammonium carbonate, ammonium chloride, ammonium nitrate and ammonium sulfate.

The invention is characterized by a series of steps as follows:
(a) Continuously withdrawing as a partial stream from the reactor a minor part of the vapor phase contained therein;
(b) Introducing into said partial stream a stream of a gaseous acid compound in excess of what is stoichiometrically needed to neutralize the free ammonia in said partial stream;
(c) Cooling the thus combined streams for co-condensation of the water and the salt of ammonia with the gaseous acid compound contained in said stream;
(d) Passing the condensate into and through a conductivity cell;
(e) Using the measured conductivity for regulation of the process in the neutralization reactor.

DETAILED DESCRIPTION

Figure 1:
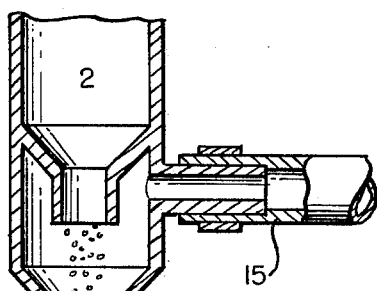

FIG. 1 shows how varying concentrations of (a) free ammonia (b) ammonium nitrate and (c) ammonium carbonate give varying electrical conductivity readings. It is seen that varying concentrations of ammonium carbonate give a much wider range of electrical conductivity readings than either free ammonia or ammonium nitrate. Thus, it is evident that the use of a gaseous compound, e.g., carbon dioxide, which converts the free ammonia to ammonia carbonate, gives considerably better results than the use of a nongaseous acid compound, e.g., nitric acid, which converts the free ammonia to ammonia nitrate.

In FIG. 1, the symbol for the ordinate axis represents the conductance and is measured in milliSiemens which is the same as milli-mhos (ohms$^{-1}$).

Figure 2:
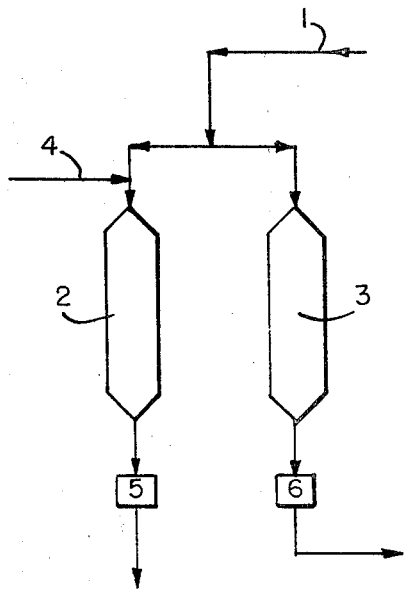

FIG. 2 illustrates how a stream of vapor can be removed (preferably at constant velocity) from a reaction zone by means of a conduit 1 and passed into cooling means 2 and 3. A gaseous acid compound is introduced into cooler 2 via pipe 4. Adjacent the lower ends of coolers 2 and 3 two measuring cells 5 and 6 are provided to indicate or record the electrical conductivity of the condensates produced in each cooler. The difference between these conductivity readings is a good indication of the ammonia content in the vapor exiting through line 1 and can, via suitable and well known amplifying means, be utilized for automatically actuating the valves which regulate the introduction of the reactants (ammonia and acid) to the reactor (not shown).

Figure 3:
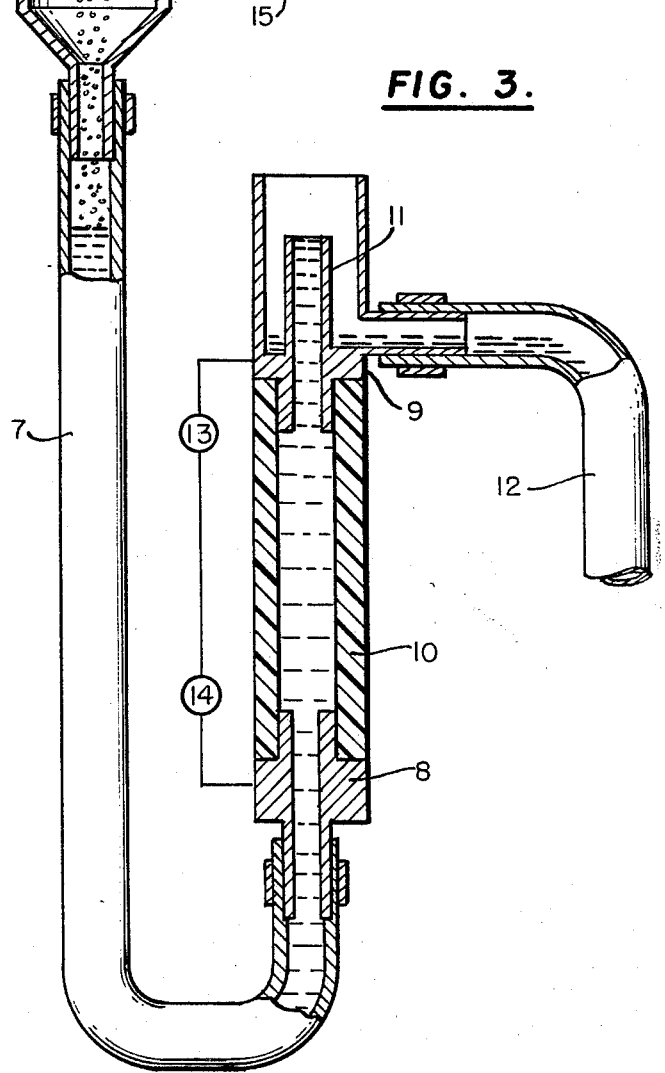

A preferred arrangement of a conductivity cell in accordance with this invention is shown in FIG. 3. The bottom end of the cooler 2 is connected with a conductivity cell by means of a pipe 7, said pipe being preferably made of an insulating material such as plastic. The conductivity cell is seen to consist of two electrodes 8 and 9 which are separated from each other by a pipe 10 of plexiglass or some other suitable insulating material. Above the electrode 9 is arranged a liquid level regulator 11 and an outlet pipe 12. A voltage source 13 is connected between the electrodes 8 and 9. The electrical current is rectified and amplified in 14 (in a manner well known in the art) to give the output needed for the indicating, recording and/or regulation devices (which are also well known in the art). In the bottom end of the coolers is arranged a side pipe 15 for the outlet of the uncondensed gases passing through the cooler.

What is claimed is:
1. In the known process for the manufacture of ammonia salts selected from the group consisting of ammonium acetate, ammonium phosphate, ammonium carbonate, ammonium chloride, ammonium nitrate, and ammonium sulfate by reacting ammonia and a corresponding acid in a reaction zone which includes a vapor phase containing free ammonia, the improvement which comprises:
(a) continuously withdrawing from the reaction zone a portion of the vapor phase contained therein,
(b) dividing said portion into two streams,
(c) introducing into one of the said streams carbon dioxide in excess of what is needed to neutralize the free ammonia in the vapor phase,
(d) passing each stream through its own separate cooling zone to form condensates,
(e) measuring the electrical conductivity of said condensates from each cooling zone,
(f) and regulating the introduction of reactants to the said reaction zone in accordance with the conductivity measurements of the acidified sample compared with the non-acidified sample.

2. A process according to claim 1 wherein the ammonium salt is ammonium nitrate.

3. A process according to claim 1 wherein the condensate from each cooling zone passes into a conductivity cell consisting of a pipe made of insulating material and containing two electrically connected electrodes which are insulated mutually as well as towards the inlet and outlet pipes of the cell.

4. A process as claimed in claim 3 wherein the ammonium salt is ammonium nitrate,

References Cited

UNITED STATES PATENTS

| | | | |
|---|---|---|---|
| 1,739,230 | 12/1929 | Hickman | 23—230(A) |
| 3,085,000 | 4/1963 | Lupfer | 23—103X |

OSCAR R. VERTIZ, Primary Examiner

G. T. OZAKI, Assistant Examiner

U.S. Cl. X.R.

23—61, 100, 107, 119, 230; 260—541